(12) United States Patent
Mulye et al.

(10) Patent No.: US 9,850,870 B2
(45) Date of Patent: Dec. 26, 2017

(54) GAS-ASSISTED FLUID ATOMIZING INJECTOR

(71) Applicant: NOSTRUM ENERGY PTE. LTD., Singapore (SG)

(72) Inventors: Nirmal Mulye, Kendall Park, NJ (US); Osanan L. Barros Neto, Commerce Township, MI (US)

(73) Assignee: NOSTRUM ENERGY PTE. LTD., Singapore (SG)

( * ) Notice: Subject to any disclaimer, the term of this patent is extended or adjusted under 35 U.S.C. 154(b) by 0 days.

(21) Appl. No.: 15/028,748

(22) PCT Filed: Oct. 15, 2014

(86) PCT No.: PCT/US2014/060636
§ 371 (c)(1),
(2) Date: Apr. 12, 2016

(87) PCT Pub. No.: WO2015/057801
PCT Pub. Date: Apr. 23, 2015

(65) Prior Publication Data
US 2016/0273502 A1 Sep. 22, 2016

Related U.S. Application Data

(60) Provisional application No. 61/891,111, filed on Oct. 15, 2013.

(51) Int. Cl.
*F02M 61/18* (2006.01)
*F02M 67/02* (2006.01)
(Continued)

(52) U.S. Cl.
CPC ..... *F02M 61/1813* (2013.01); *F02B 23/0648* (2013.01); *F02B 23/0651* (2013.01);
(Continued)

(58) Field of Classification Search
CPC .......... F02M 61/1813; F02M 23/0648; F02M 23/0651; F02M 69/046; F02B 2075/125
(Continued)

(56) References Cited

U.S. PATENT DOCUMENTS 3,603,092 A  9/1971  Paine et al.
3,675,425 A  7/1972  Scannell et al.
(Continued)

FOREIGN PATENT DOCUMENTS

EP   2 587 040 A2   5/2013
WO   WO 2014/080265 A1   5/2014

OTHER PUBLICATIONS

International Search Report dated Jan. 14, 2015 issued in PCT/US2014/060636.
(Continued)

*Primary Examiner* — Mahmoud Gimie
(74) *Attorney, Agent, or Firm* — Scully Scott Murphy and Presser

(57) ABSTRACT

A liquid injector atomizer for direct injection in to the cylinder of an internal combustion engine is provided, with a supply of pressurized liquid a supply of pressurized gas, a body, and a nozzle with two or more orifices each for the liquid and the gas. Each orifice directs a jet of metered pressurized liquid or gas out of the injector body. At least two of the liquid jets are aimed at one or more collision points, where at least two gas jet streams collide at a same collision point or another collision point, thereby creating a finely atomized liquid.

31 Claims, 3 Drawing Sheets

(51) Int. Cl.
*F02M 67/10* (2006.01)
*F02B 23/06* (2006.01)
*F02M 51/06* (2006.01)

(52) U.S. Cl.
CPC ............ *F02M 67/02* (2013.01); *F02M 67/10* (2013.01); *F02M 51/06* (2013.01)

(58) Field of Classification Search
USPC ........................................ 123/298, 531, 533
See application file for complete search history.

(56) References Cited

U.S. PATENT DOCUMENTS

| | | | |
|---|---|---|---|
| 4,707,983 A | 11/1987 | Gillon, Jr. | |
| 5,190,216 A | 3/1993 | Deneke | |
| 5,218,943 A | 6/1993 | Takeda et al. | |
| 5,540,200 A * | 7/1996 | Naitoh | F02M 51/065 123/299 |
| 6,351,939 B1 * | 3/2002 | Buddenbohm | F02K 9/52 60/204 |
| 6,460,344 B1 | 10/2002 | Steinthorsson et al. | |
| 2003/0041844 A1 | 3/2003 | Yoshimoto | |
| 2006/0169804 A1 * | 8/2006 | Pontoppidan | F02M 61/1813 239/533.12 |
| 2010/0068111 A1 | 3/2010 | Walsh, Jr. | |
| 2010/0264233 A1 | 10/2010 | Asikkala | |
| 2013/0043330 A1 | 2/2013 | Corless | |

OTHER PUBLICATIONS

Extended European Search Report dated May 31, 2017—PCT/US2014060636.

* cited by examiner

GAS-ASSISTED FLUID ATOMIZING INJECTOR

I. CROSS-REFERENCE TO RELATED REFERENCES

The present application claims the benefit of U.S. Provisional Patent Application Ser. No. 61/891,111 filed Oct. 15, 2013, the contents of which are incorporated by reference. The present application further incorporates by reference the whole disclosure and contents of commonly-owned, U.S. Provisional Patent Application No. 61/891,118 filed Oct. 15, 2013 and entitled "LIQUID INJECTOR ATOMIZER WITH COLLIDING JETS".

II. FIELD OF THE DISCLOSURE

The present disclosure relates generally to an apparatus and method for generating an atomized liquid. More particularly, the present disclosure is directed to a gas-assisted atomizing liquid injector.

III. BACKGROUND OF THE DISCLOSURE

Generally in pressure atomizers the quality of atomization is improved by providing additional energy through a gas medium. Two common techniques are employed in the prior art, namely air assist and air blast. Air assist and air blast operate on a similar principle but differ in quantitative aspects of the 'Air' component. In the air assist technique, a small quantity of air at very high velocity (or pressure) is employed, whereas in the air blast technique a relatively large quantity of air at low velocities is employed. Both the quantity and velocity of air has to be understood in relative terms with respect to the related parameters of the liquid being atomized. In all cases, atomization depends on air-shear to break up the liquid column coming out of the orifice with some turbulence and may achieve some evaporation as well. It is understood that gas or air, achieve magnitude higher speeds at the same pressure compared to liquid being atomized at the same pressure.

There are also two common techniques defining where the air and liquid streams interact: 'Internal Mixing Type' where the two streams interact inside the atomizer body and 'External Mixing Type' where the two streams interact outside after the two streams exit their respective orifices. In both these concepts the atomization is due to a turbulent shear action of air moving over a liquid jet or liquid film.

Atomizers where two or more gas or air jets collide with a central liquid jet at a common focal point are also known. There are also further designs known where two or more coaxial composite jets collide at common focal point.

IV. SUMMARY OF THE DISCLOSURE

An embodiment of the present invention is an atomizing injector having an injector body, and a gas regulating means configured to regulate the flow or pressure through gas orifices internal or external to the injector body.

The injector body is structured with a liquid inlet, a liquid metering means either within the body or outside the body, and a liquid outlet comprising a nozzle. The nozzle comprises an interior end, an exterior end, and two or more passages that originate from the interior end and terminate at the exterior end with a respective liquid orifice.

In an embodiment of the present invention, a pressurized liquid is forced through the two or more passages to the orifice terminating each passage, and at least one gas jet is being forced through the gas orifices, where each liquid orifice and each gas orifice directs a jet of the pressurized liquid and gas, respectively. The orifices are configured such that at least two liquid jets and two gas jets are aimed at one or more common focal point external to the injector, wherein the collision of pressurized liquid jets and gas jets at each focal point creates an atomized form of the liquid.

In another embodiment of the present invention, an injector includes at least two liquid jets colliding at a focal point; and at least two gas jets colliding at a focal point. In an embodiment of the present invention, the focal point of the colliding liquid jets is the same as the focal point of the colliding gas jets. In an embodiment of the present invention, the focal point of the colliding liquid jets is different than the focal point of the colliding gas jets.

In an embodiment of the present invention, the angle formed between each liquid jet and a central axis of the injector is between 5° and 85°, inclusively. In another embodiment, the angle formed between each gas jet and a central axis of the injector is between 0° and 75°, but exclusive of 0° and inclusive of 75°. In another embodiment, the angle formed between each liquid jet and a central axis of the injector is between 5° and 85°, inclusively, and the angle formed between each gas jet and a central axis of the injector is between 0° and 75°, but exclusive of 0° and inclusive of 75°.

In an embodiment of the present invention, the pressure applied to the liquid is between 0 and 3000 bars, inclusive, and any value therebetween any of the aforementioned ranges. The gas is pressurized at between 0 and 200 bars, inclusive. The liquid metering means provides a precise quantity of liquid flow and the gas metering provides a precise quantity of gas flow. The liquid metering provides a precise start and stop time, and the gas metering provides a precise start and stop time. The pressure applied to the liquid can be, in an embodiment, from about 2 bars to about 100 bars, if being atomized in a space with ambient pressure. If the liquid is being injected into a space with higher pressure, atomization pressure may range from about 30 bars to about 2000 bars. The gas is pressurized from about 1 bar to about 40 bars.

In another embodiment of the present invention, the liquid jet has a velocity exiting the orifice that is greater than 5 m/s. Alternatively, the liquid jet has a velocity exiting the orifice that is greater than 50 m/s.

In another embodiment of the present invention, the distance between any liquid orifice and the collision point is less than 3 times the diameter of the injector body. Alternatively, the distance between any liquid orifice and the collision point is less than three times the distance between the two most distant orifices, and in another embodiment, the distance between any liquid orifice and the collision point is less than the distance between the two most distant liquid or gas orifices, whichever is smaller.

In another embodiment of the present invention, the orifice diameter is greater than 50 µm. The liquid jets or gas jets are produced by separate nozzles.

The liquid is selected from water, an aqueous solution, suspension and emulsion. The liquid is a fuel selected from gasoline, diesel, alcohol, JP8, kerosene, and any mixture thereof. The injector is used in an engine selected from a reciprocating internal combustion engine, a rotary internal combustion engine, a gas turbine engine and a jet engine. The injector has 2 to 30 liquid jets colliding and 2 to 30 gas jets colliding.

In an embodiment of the present invention a method of atomizing a fluid using a gas-assisted injector as described herein below is provided.

V. BRIEF DESCRIPTION OF THE DRAWINGS

These and other features, aspects, and advantages of an embodiment of the present invention will become better understood with regard to the following description, appended claims, and accompanying drawings wherein:

VI. DETAILED DESCRIPTION OF DISCLOSURE

Glossary of Terms

The following terminology is defined to facilitate the detailed description of the structure and operation of the inventive atomizer.

$\Delta P$—Injection Pressure (above the ambient pressure)—in Pa.

$A_o$—Orifice Area=$\pi d_o^2/4$ in m$^2$; $d_o$—orifice diameter in m.

EFP—Equivalent force parameter.

$\rho$—Density in kg/m$^3$.

$\sigma$—Surface tension of a liquid in N/m.

Cd—orifice discharge coefficient.

Cv—orifice velocity coefficient n—number of orifices or jets

W—mass flow rate=$n \times Cd \times A_o (2\Delta P \times \rho)^{1/2}$ in kg/s.

Q—volume flow rate=$W/\rho = n \times Cd \times A_o (2\Delta P/\rho)^{1/2}$ in m$^3$/s.

$\alpha$—generic angle between the jet axis and the body axis a-a; $\alpha = \phi$ or $\theta$ as per the case.

RoEinA—rate of energy inflow in axial direction=$W (\Delta P/\rho) \cos^2 \alpha$.

RoEinR—rate of energy inflow in radial direction=$W (\Delta P/\rho) \sin^2 \alpha$.

RoMinA—rate of momentum inflow in axial direction=$W (2\Delta P/\rho)^{1/2} \cos \alpha$.

RoMinR—rate of momentum inflow in radial direction=$W (2\Delta P/\rho)^{1/2} \sin \alpha$.

V—orifice velocity in m/s; $V = Cv \cdot (2\Delta P/\rho)^{1/2}$

For clarity, all parameters and variables referenced below that are subscripted with "L" denote that the parameter or variable relates to a liquid, and all parameters and variables subscripted with "g" denote that the parameter or variable relates to a gas.

EXAMPLE EMBODIMENT OF THE DISCLOSURE

Figure 1:
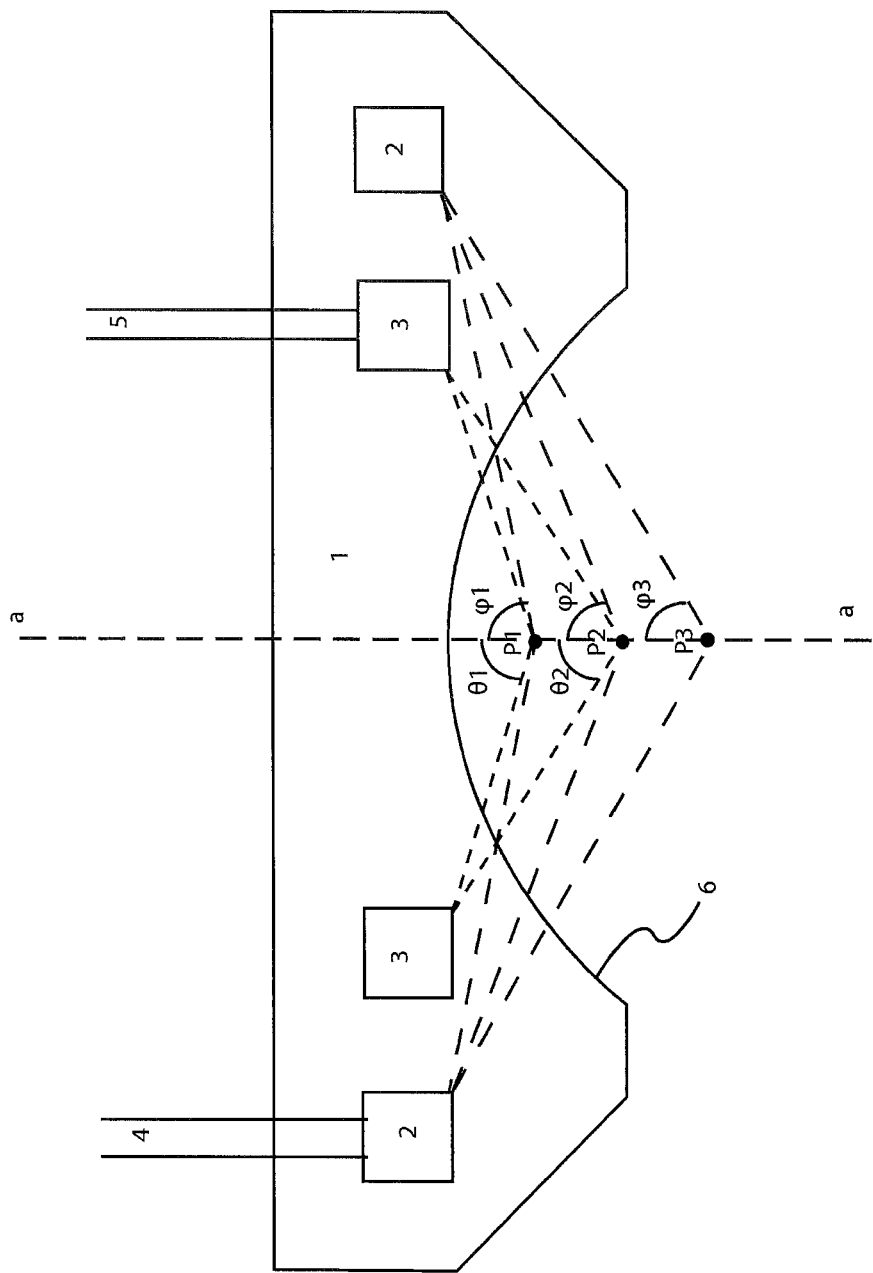
FIG. 1 illustrates a block representation of an example embodiment of the present invention.

Referring to FIG. 1, various potential embodiments are illustrated. The injector body 1 with its central axis a-a, is shown as an injector tip portion for illustrative purpose only. The injector body 1 contains annular (circumferential) cavities 2 and 3, which are in fluid communication with respective inlet passages 4 and 5. From the annular cavity 2, a plurality of outgoing passages, represented by dashed lines, pass a pressurized fluid supplied to cavity 2 as jets, focused at respective focal points P1, P2 and P3 and inclined at angles $\phi 1$, $\phi 2$ and $\phi 3$ respectively through respective exit orifices on the exterior of the injector body 1. Similarly from the annular cavity 3, a plurality of outgoing passages, represented by dashed lines, pass a second pressurized fluid, e.g., gas, such as air or steam, and in the context of rotary internal combustion engine, an EGR type gas, supplied to the cavity 3 as jets focused at respective focal points P1 and P2 and inclined at angles $\theta 1$ and $\theta 2$ respectively through respective exit orifices on the exterior of the injector body 1.

In view of FIG. 1, when embodied in an internal combustion engine, for each cylinder, the injector body 1 and configuration of annular cavities 2 and 3 providing pressurized fluid and gas, respectively, is mounted to a cylinder head portion of the engine to provide a homogeneous charge, in the manner as described herein, under controlled conditions of temperature and pressure for combustion in a cylinder, e.g., at every compression cycle. A fuel reservoir provides fuel to a fuel pump (similar to common rail, not shown) which supplies metered amounts under precise and controllable start and stop times, e.g., via a solenoid controlled pintle or a piezo-electric controlled pintle, or like metering means (not shown), pressurized fluid, e.g., fuel or water, via an inlet passage 4 or like transport means to the injector body, e.g., to each cavity 2, for direct charging as a liquid column in the engine cylinder, aimed at a focal point external to the injector, in the manner as described herein. A gas compressor, under timed control, provides pressurized gas via an inlet passage 5 or like transport means to the injector body, e.g., at each cavity 3. via a solenoid controlled pintle or a piezo-electric controlled pintle, or like metering means, metered amounts of pressurized gas jets at the precise and controllable start and stop times are aimed and injected at the focal point for breaking up the liquid column, in the manner as described herein, to result in the injector body 1 providing the gas-assisted atomized form of the liquid into the cylinder chamber for combustion at the cylinder. In one embodiment, an ignition coil controls firing of a spark plug (for SI type engines only, not shown) mounted, in one embodiment, proximate the center of the injector body 1, at the cylinder head portion.

In an embodiment, the outgoing passages for both liquid and gas jets are inclined to collide at the same focal point. In another embodiment, the outgoing passages for liquid and gas jets are inclined to collide at different focal points, thus producing two or more separate collision points.

In the embodiment shown in FIG. 1, the exit orifices on the exterior of the injector body are arrayed at the same radial distance from the injector axis a-a of the body, and equiangularly spaced.

In an embodiment the exit orifices may be arrayed at the same radial distance from the central axis of the body, and not equiangularly spaced. In an embodiment, the injector body defines a concave section on the exterior end, and the liquid and gas jet exit orifices are within the concave section, In an embodiment, the angle defined by a line from an exit orifice to a focal point along the injector axis a-a to an adjacent orifice is equal for all orifices on any plane.

Figure 3:
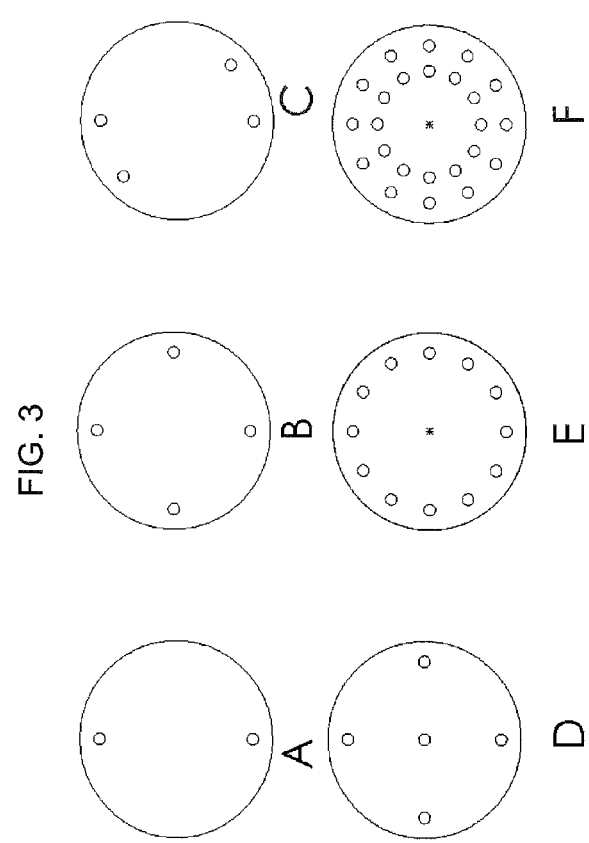
FIG. 3 shows various nonlimiting patterns of orifices that may be employed in the instant invention.

In an embodiment, an optional orifice may be additionally provided at the center of the injector body along axis a-a, as seen from embodiment "D" in FIG. 3.

In an embodiment, the number of exit orifices is more than two, and may range to as high as fifty orifices. Fluid dynamics indicates that liquid jets from two orifices will give a flattened fan shaped diffusion cloud after collision, but three or more orifices will give a three dimensional rounder cloud. Larger numbers of orifices will have a greater output of liquid (all other factors being equal). In engine applications, for example, an injector for a car engine may have a diameter of about 8 mm and have 2-6 orifices. An injector for a stationary heavy diesel engine may have an injector that is about 5 cm in diameter and have 3 to 30 or more orifices.

In another embodiment, two (or more) rings of radial exit orifices may be provided, wherein a first set of orifices has a certain radial dimension from the injector axis a-a of the injector, and a second set of orifices as a different radial dimension, wherein all of the orifices are aimed at a single or multiple collision points. FIG. 3 shows various nonlimiting patterns of orifices that may be employed in the instant invention.

In an embodiment, the liquid and gas jets are not all of equal inlet pressure or orifice diameters and collision velocity or force.

In an embodiment, an exit orifice diameter may range from about 50 μm to about 5000 μm, or larger, depending on the flow rate required. In an embodiment, the orifice diameter ranges from about 200 μm to about 400 μm and the liquid is a hydrocarbon fuel. In an embodiment, the orifice diameter ranges from about 300 μm to about 700 μm and the liquid is water or an aqueous solution.

In an embodiment of the present invention only focal point P1 is present, thus all liquid jets and gas jets collide at a single point. In an alternative embodiment, focal points P1 and P2 are present, thus a subset of liquid jets and gas jets collide at P1 and a second subset of liquid jets and gas jets collide at P2. In an alternative embodiment, the liquid jets collide with one another at P1 and/or P2, while the gas jets collide with one another at P3. Other collision configurations of the present invention can be readily appreciated from FIG. 1 and the description herein.

In one embodiment, as described hereinabove, the liquid and gas jets collide at a single point. If the liquid jets and the gas jets do not collide at a single point, the focal points of the collision of the liquid jets and the collision of the gas jets are juxtaposed (adjacent) to one another so that the distance between the focal points of the collisions between the liquid jets and the collision of the gas jets range ranges from the mean diameter of the liquid orifice up to about 10 times the mean diameter of the liquid orifice. For example, the distance between where the liquid jets collide with one another and the gas jets collide with one another is 0 (the same point), or any distance from about 0 to about 10 times the mean diameter of the liquid orifice, e.g., the distance is between 0 and the size of the mean diameter of the liquid orifice, or the distance is up to the mean diameter of the liquid orifice, or up to 2 times the mean diameter of the liquid orifice, or up to 3 times the mean diameter of the liquid orifice, or up to 4 times the mean diameter of the liquid orifice, or up to 5 times the mean diameter of the liquid orifice, or up to 6 times the mean diameter of the liquid orifice, or up to 7 times the mean diameter of the liquid orifice, or up to 8 times the mean diameter of the liquid orifice, or up to 9 times the mean diameter of the liquid orifice or up to about 10 times the mean diameter of the liquid orifice. Thus, in an embodiment along injector axis a-a, a distance between two juxtaposed (adjacent) focal points, i.e., between focal point P1 and P2 and/or between P2 and P3, is 0 or less than the mean diameter of the liquid orifice and up to about 10 times the mean diameter of the liquid orifice.

It should be understood that each of these passages has a starting point in the respective cavity and an ending point on the concave external surface 6 as an orifice. The respective dashed lines represent the path of the pressurized fluid from the respective cavity 2, 3, through the passages to the focal points P1, P2, P3. If the cavity 2 is supplied with pressurized gas from the inlet 4 then the cavity 3 will be supplied with pressurized liquid from the inlet 5. In the alternative, it is understood that liquid can be supplied to cavity 2 and gas can be supplied to cavity 3.

An embodiment of the inventive gas assist colliding jet atomizer incorporates a radial component of momentum of the liquid jets $(RoMinR)_L$ which is completely destroyed and the forces so generated or the energy so made available $(RoEinR)_L$ is put to a primary liquid breakup process and loses any directionality. The axial components of momentum and energy $(RoMinA)_L$ and $(RoEinA)_L$ are the components that give directionality (movement away from injector face generally along the axis a-a) to the liquid plume. This directionality of the liquid plume or cloud is further reduced to zero or nearly zero by the opposing component of the annihilated momentum of the colliding gas jets, which is a value at about half (and in other embodiments, ranging between 0.25 to 0.75 of) of the total annihilated momentum of the colliding gas jets. Assuming the value is represented as '$\chi$', this interaction can be expressed mathematically as:

$$\chi \cdot (RoMinR)_g = (RoMinA)_L; \text{ or}$$

$$\chi \cdot W_g (2\Delta P_g/\rho_g)^{1/2} \sin \phi = W_L (2\Delta P_L/\rho_L)^{1/2} \cos \theta; \text{ or}$$

$$(EFP)_g/(EFP)_L = (A_g/A_L) \times (\Delta P_g/\Delta P_L) = (\cos \theta / \chi \sin \phi)(n \cdot Cd \cdot Cv)_L/(n \cdot Cd \cdot Cv)_g$$

Thus, the pressure and the orifice area for the gas component can be calculated for a given set of parameters ($A_L$ and $\Delta P_L$) fixed for the liquid component only in terms of the two collision angles, number of respective jets and certain well known empirical coefficients. Based on these equations, there are a few practically feasible combinations of ($n_g$, $A_g$ and $\Delta P_g$) from which a gas-assisted jet in combination can be easily selected. In one embodiment, using the equations hereinabove, the variables $A_g$ and $A_L$ or $\Delta P_g$ and $\Delta P_L$ are the design variable choices. The equations provided herein, obviates the independent choice of one of these four design variables choices with both the liquid and gas injection pressures and angles at or within the ranges as described herein below.

The inventive gas assist colliding jet atomizer results in significantly improved atomization quality (very fine liquid droplets of about 1 μm diameter or even smaller), controlled shorter lengths of the spray cloud and facilitate faster evaporation leading to complete mixing.

The following provides a further description of the parameters and considerations involved in implementing embodiments and modifications of the present invention.

Complete mixing of injected fuel and air in the shortest possible time is required to produce near homogeneous charge. Smallest mean droplet size and uniform dispersion of the droplets within the space in which the liquid is injected are the desired objectives of an embodiment of the present invention. Colliding liquid jets can achieve good atomization by selecting the number of jets, injection pressure, and collision angle in an optimized combination. The total energy provided by the liquid jets at the collision point available for atomizing the liquid, i.e., collision energy, is used up in this process and the spray plume is left to further develop in the cylinder space, where it may be possible that moving droplets may coalesce to form larger droplets or stratification within the spray plume. It is, thus, necessary to provide additional energy for further breakup the spray plume into very fine droplets (~1 μm diameter or less) to facilitate evaporation and enhance the mixing quality.

Such additional energy can be provided by a plurality of air or gas or steam jets colliding at the same focal point or, in another embodiment, at a separate focal point situated along the injector axis. At low pressures the density of gas is about 1000 times lower than the liquid. Thus, imparting sufficient additional energy by way of the gas jets requires either very high mass flows or very high velocities through correspondingly high injection pressures.

Total Available Energy (TAE) and Collision Energy (CE) of 1 gram of gasoline and water injected at various pressures and with various collision angles are computed using the properties given in Table 1 and are illustrated as an example in Table 2 below:

TABLE 1

| | $m^2/s$ | N/m | $kg/m^3$ | kJ/kg | kJ/kg · K | ° C. |
|---|---|---|---|---|---|---|
| Liquid | ν ($\times 10^6$) | σ ($\times 10^3$) | ρ | $h_{fg}$ | Cp | BP |
| Gasoline | 0.80 | 22.0 | 760 | 628.1 | 2.010 | 27-225 |
| Water | 1.00 | 72.6 | 998 | 2257.4 | 4.187 | 100 |

TABLE 2

| ΔP, BAR | | 1 | | | 5 | | | 10 | |
|---|---|---|---|---|---|---|---|---|---|
| 2Θ | 90° | 120° | 150° | 90° | 120° | 150° | 90° | 120° | 150° |
| $TAE_F$ | | 12.5 | | | 62.5 | | | 125 | |
| $CE_F$ | 6.25 | 9.375 | 11.663 | 31.25 | 46.875 | 58.315 | 62.5 | 93.75 | 116.63 |
| $TAE_W$ | | 9.519 | | | 47.6 | | | 95.2 | |
| $CE_W$ | 4.76 | 7.139 | 8.882 | 23.8 | 35.7 | 44.4 | 47.6 | 71.4 | 88.8 |

TAE = 100(ΔP/ρ) in kJ;
CE = TAE × $\sin^2\theta$ in kJ;
suffix F for gasoline,
W for water The ultimate 'breakup' for a liquid mass is its evaporative phase change through sensible heating and boiling, involving a supply of latent heat and a relatively large quantity of energy per unit mass. Mechanical breakup, or atomization, constitutes converting a given liquid mass into a very large number of smaller liquid particles by overcoming the surface tension. The mechanical energy of breakup ($E_{BU}$) required for atomizing 1 gram of liquid to a mean droplet diameter D in (μm) is given by $E_{BU}=6000(\sigma/\rho D)$ in J/g, where σ is surface tension in N/m; ρ is density in $kg/m^3$; D is droplet diameter in μm. In one embodiment, the $E_{BU}$ (J/kg)=σ×ΔA (change in surface area in $m^2$), with ΔA=N×π×$D^2$; N (number of drops per kg of liquid)=$(1/\phi/(\pi D^3/6))$; $E_{BU}=6\sigma/\rho D$, J/kg. With droplet diameter D in the range of μm, then $E_{BU}=6\cdot 10^6\sigma/\rho D$ in J/kg or $6000(\sigma/\rho D)$ in J/g. $E_{BU}$ is very small, as seen in Table 3 below, in comparison with potential and kinetic energies provided to 1 gram of a liquid through pressure or velocity. 1 J/g of energy corresponds to 44.7 m/s velocity and 10 bar pressure for water and can generate droplets of 0.44 μm. Similar numbers for gasoline are: 44.7 m/s velocity, 7.6 bar pressure and droplets of 0.18 μm.

An embodiment of the present invention utilizes the breakup energy by the following mechanisms: 1) inducing transverse vibrations in a length of a liquid column, 2) making the liquid column interact with the surrounding gaseous medium and use viscous and turbulent effects, 3) colliding two or more liquid drops on each other.

In any of the above mechanisms, any supplied energy, apart from the energy used for breakup, is used to impart some kinetic energy to the medium in which the jet is injected and in overcoming the losses associated with viscous drag and turbulent mixing.

TABLE 3

| | $E_{BU}$ = 6000(σ/ρD) in J/g | | |
|---|---|---|---|
| Liquid D in μm | 10 | 1 | 0.1 |
| Water | 0.0437 | 0.437 | 4.37 |
| Gasoline | 0.0174 | 0.174 | 1.74 |

Pressurized liquid is supplemented with pressurized gas and the interaction between these two fluids is determined by the atomizer design. In an embodiment of the present invention, there is 'external mixing' so that two separate streams from two orifices interact outside of the atomizer. When the pressurized gas is air then depending upon the relative airflow rate and air velocity, these are termed as 'air assist' (when the flow rate is small and velocity is large) or 'air blast' (when the flow rates are large and velocity is small). In either case the air velocity is higher than the liquid velocity. The 'air blast' type is very common in fuel injectors for gas turbine engines. 'Air assist' is used in spray painting, agricultural spraying, powder manufacture etc.

The energy required for breakup of the liquid jets can be provided much more efficiently and at low pressures by collision of liquid jets. The energy required for the breakup of a liquid stream is governed by surface tension of the liquid. A force greater than the surface tension away from the direction of the movement of the liquid must be applied to achieve breakup. The work or energy required for such break up is given by W=σ×ΔA, where W is work, σ is surface tension and ΔA is the area created due to break up. The specific energy of the jet is given by the equation TAE=ΔP/ρ.

The energy used for the breakup which is responsible for the breakup away from the direction of the movement of the jet is given by, $E_{BU}=(\Delta P/\rho)\sin^2\alpha$, where α is the angle formed between the jet axis and the body axis a-a formed by the collision point and the direction of the movement of the plume or the injector body. That is, α=ϕ or θ as per the case. For smaller angle α, the jets will meet at a further distance than for a larger angle, and therefore higher energy or pressure would be required to achieve breakup. With respect to the angles shown in FIG. 1, α is associated with angle θ and angle ϕ. Combining both expressions to calculate $E_{BU}$, it follows that:

$$N_j\cdot(\Delta P/\rho)\sin^2\alpha=6\cdot 10^6\sigma/\rho D$$

This equation relates diameter D to the rest of design variables: wherein ΔP for liquid and gas, α=φ or θ, and $N_j$=number of impinging jets of gas and liquid.

Once small particles/liquid droplets are created from a liquid volume with surface tension σ, they have a tendency to coalesce due to relatively high internal pressure. For a stationary drop of diameter D, the pressure equivalent of the surface tension force $F_\sigma=\sigma \times \pi \times D$, is $P_\sigma=F_\sigma/(\pi D^2/4)=4\sigma/D$. The pressure and temperature in the port are close to ambient atmospheric (P=1 bar, T=288 K and $\rho_a$=1.21 kg/m$^3$). If 1 g of a liquid of density $\mu_L$ kg/m$^3$ (of original volume $\delta V=(1 \cdot 10^{-3}/\rho_L)$ m$^3$) breaks up in droplets of diameter D μm then the change in surface area $\Delta A=\delta V(6 \cdot 10^6/D-1) \approx 6 \cdot \delta V \times 10^6/D$ in m$^2$. Energy to be provided for this is $\Delta E_\sigma=6 \times \sigma \times \delta V \times 10^6/D$ in J. For the liquid droplets (of very small size D≈1 μm) the internal pressure $P_i$ is very high as compared to the ambient gas static pressure $P_g$. Moreover, additional external pressure has to be provided through aerodynamic drag in order to maintain a state of dynamic equilibrium for a sufficient time duration necessary for evaporation.

Figure 2:
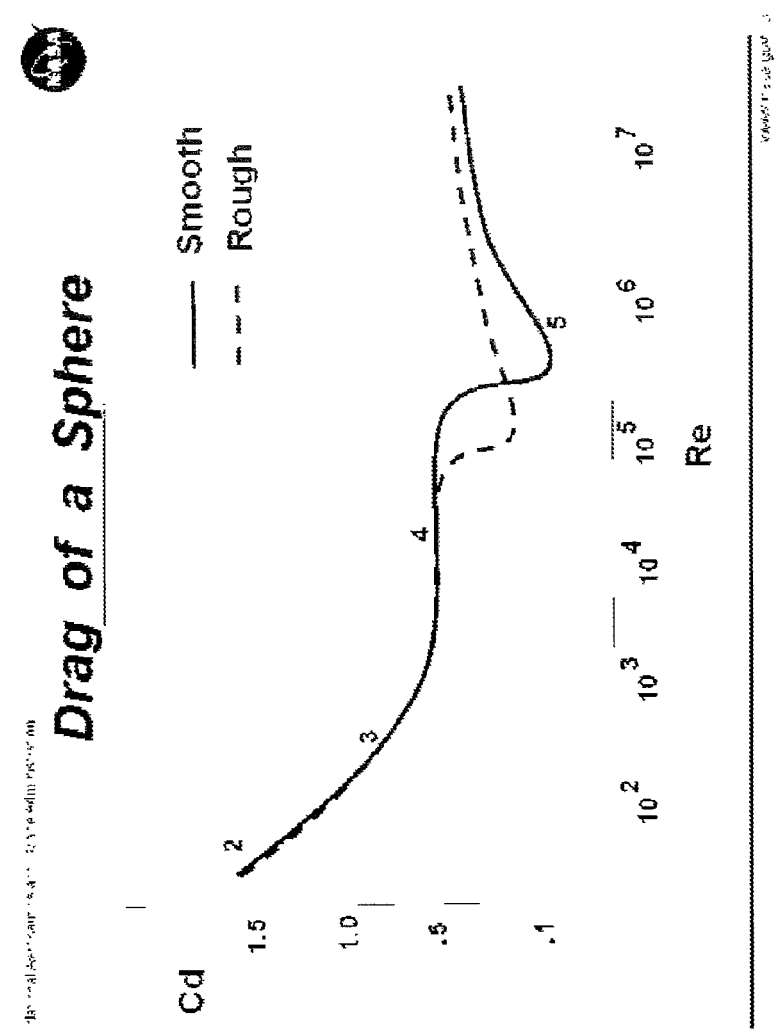
FIG. 2 illustrates a graph representing drag coefficient of a spherical droplet as a function of Reynolds number Re=$(V \cdot d \cdot \rho)/\mu$, where V is relative velocity between the droplet and the medium, d is droplet diameter in m, $\rho$ is medium density in kg/m$^3$, and $\mu$ is viscosity of the medium in (Pa·s) or (kg/m/s).

The initial relative velocity of the gas component $V_R$ must satisfy the force equality: Drag≥$F_\sigma$. In other words, for spherical droplets of diameter D and drag coefficient $C_D$, the following applies: $\frac{1}{2}C_D \times \rho_g \times V_R^2 \geq P_\sigma \geq 4\sigma/D$. For these spherical droplets of diameter D and drag coefficient $C_D$, the minimum required gas injection pressure, given by the equation ($\Delta P_g=\frac{1}{2} \times \rho_g \times V_R^2$), can also be expressed as $\Delta P_g=4\sigma/(D \times C_D)$. The drag coefficient $C_D$ as a function of Re is an iterative input from the data, such as shown in FIG. 2 [$C_D=4.2-2.1(\log_{10}Re)+0.3(\log_{10}Re)^2$, Re≤1000] or through the correlation: $C_D=24(1+Re^{2/3}/6)/Re$; Re=$V_R \times D/\nu \leq 1000$. Coalescence especially is an issue, if the atomization occurs in stationary or relatively stationary air/gas.

The combination of colliding liquid jets along with collision of gas jets provides the best of both worlds with far better control over directionality of the spray at forward momentum and speed. This also provides a far more efficient breakup of the liquid.

The requirements of atomizers suitable for direct injection in internal combustion engines necessitate the use of the lowest possible energy for the gas stream for a given fuel flow rate to achieve the best possible atomization, leading to fast evaporation of the liquid fuel and its complete mixing with the air charge. Moreover, such supply of the gas at required pressure (and temperature) can be readily made available within the engine system, thus implementation of an embodiment of the present invention is inexpensive.

Liquid jets must collide well before their breakup point to generate maximum collision energy. In the context of the present invention, the breakup point is understood as the point along a stream of liquid where the integrated opposing force just exceeds the driving momentum force. An expression for jet length, as measured linearly from the jet orifice to the breakup point, is characterized as $L=A_o\times\Delta P/\sigma$, where L is the length from the orifice exit to the breakup point. Consequently, the liquid jets, in an embodiment of the present invention, are configured to collide at a distance from the orifice exits less than $L=A_o\times\Delta P/\sigma$. Another correlation can be used, for example: $A_o\times\Delta P=\sigma L+\rho_a\,\pi d_o\times C_{dc}\times(\Delta P/\rho_L)\times f\{L\}$, with f{L} being determined analytically and corrected experimentally.

In an embodiment of the present invention, two or more liquid jets collide at a liquid collision focal point and two or more gas jets collide at a gas collision focal point. In an embodiment of the present invention, the liquid collision focal point and the gas collision focal point are coincident. In other words, the liquid jets and the gas jets collide at a common collision focal point. In an embodiment of the present invention, the liquid collision focal point and the gas collision focal point are not coincident, but are coaxial. In other words, the liquid jets and the gas jets collide at different collision focal points located along the central axis a-a of the injector body 1. To maximize the resulting effect, as mentioned above, if the focal points of the liquid jet and the gas jet are not coincident, an axial distance between two juxtaposed (adjacent) focal points should be close to one another as possible. In one embodiment, the distance between focal point P1 and P2 and/or between P2 and P3, is equal to or is less than the mean diameter of a liquid orifice. In a further embodiment, the distance between two juxtaposed (adjacent) focal points, i.e., between focal point P1 and P2 and/or between P2 and P3, may be some fraction of the liquid orifice diameter, or up to the mean diameter of the liquid orifice, or up to 2 times the mean diameter of the liquid orifice, or up to 3 times the mean diameter of the liquid orifice, or up to 4 times the mean diameter of the liquid orifice, or up to 5 times the mean diameter of the liquid orifice, or up to 6 times the mean diameter of the liquid orifice, or up to 7 times the mean diameter of the liquid orifice, or up to 8 times the mean diameter of the liquid orifice, or up to 9 times the mean diameter of the liquid orifice or up to about 10 times the mean diameter of the liquid orifice.

The liquid and gas jets are qualified by their respective injection pressures $\Delta P_f$, $\Delta P_g$; orifice diameters $d_{of}$, $d_{og}$; the number of orifices $n_f$, $n_g$; the net orifice areas $A_{of}$, $A_{og}$ and the respective mass flows $W_f$ and $W_g$. The respective volume flow rates $Q_f$ and $Q_g$ get thus fixed.

The orifice area ratios required for required volume or mass flow ratios can be correctly postulated from the required respective jet momentum components in axial and radial directions at the collision point(s). The said jet momentum components for the liquid and gas phases will have to be in certain proportion, as required by the final quality of atomization. The respective pressures and collision angles required to ensure the above will be adjusted accordingly.

In a preferred embodiment the collision angle for the liquid component $\phi$ is selected as close to 90° as possible so as to generate maximum possible energy from collision for breakup process and the gas component collision angle $\theta$ is so chosen as to provide sufficient kinetic energy or momentum not only to prevent any coalescence but facilitate further breakup and evaporation.

In an embodiment of the present invention, the angle formed between each liquid jet and a central axis of the injector is between 5° and 85°, inclusively. For example, the angle formed between each liquid jet and a central axis of the injector may be 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, or 85°. In another embodiment, the angle formed between each gas jet and a central axis of the injector is between 0° and 75°, excluding 0 and up to and including 75°. Thus, in an embodiment, the angle formed between each gas jet and a central axis of the injector may be 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74° or 75°. Thus, all combinations and permutations of these various angles are contemplated by the present application.

In an embodiment of the present invention, the pressure applied to the liquid is between 0 and 3000 bars, inclusively. For example, the pressure applied to the liquid is between 0-100, 101-200, 201-300, 301-400, 401-500, 501-600, 601-700, 701-800, 801-900, 901-1000, 1001-1100, 1101-1200, 1201-1300, 1301-1400, 1401-1500, 1501-1600, 1601-1700, 1701-1800, 1801-1900, 1901-2000, 2001-2100, 2101-2200, 2201-2300, 2301-2400, 2401-2500, 2501-2600, 2601-2700, 2701-2800, 2801-2900, 2901-3000 bars. In one embodiment, the gas is pressurized at between 0 and 200 bars, inclusively. Thus, for example, the gas is pressurized at between 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 56, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, or 200 bars. The liquid metering means provides a precise quantity of liquid flow and the gas metering provides a precise quantity of gas flow. Alternatively, the liquid metering provides a precise start and strop time, and the gas metering provides a precise start and stop time.

In one embodiment, the pressure applied to the liquid may be, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 bars, if being atomized in a space with ambient pressure. If the liquid is being injected into a space with a higher pressure, the atomization pressure may be, e.g., 30-100, 101-200, 201-300, 301-400, 401-500, 501-600, 601-700, 701-800, 801-900, 901-1000, 1001-1100, 1101-1200, 1201-1300, 1301-1400, 1401-1500, 1501-1600, 1601-1700, 1701-1800, 1801-1900, 1901-2000 bars. The gas pressure may be, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 bars.

In an embodiment of the present invention, the liquid jet has a velocity exiting the orifice greater than 5 m/s or ΔP is greater than 0.1 bar for the liquid, e.g., gasoline. Alternatively, the liquid jet has a velocity exiting the orifice greater than 500 m/s or ΔP is greater than 950 bar for the liquid, e.g., gasoline. In an embodiment of the present invention, the gas jet has a velocity exiting the orifice greater than 250 m/s or ΔP is greater than 0.378 bar for orifice exit conditions as 288° K and 1.0 bar. Alternatively, the gas jet has a velocity exiting the orifice greater than 5000 m/s or ΔP is greater than 151.2 bar for orifice exit conditions as 288° K and 1.0 bar.

In an embodiment of the present invention, the distance between any liquid orifice and the collision point is less than 3 times the diameter of the injector body or the distance between the two most distant orifices. The orifice diameter ranges from about 50 to about 5000 μm, inclusive, in an embodiment of the present invention.

Alternatively, the distance between any liquid orifice and the collision point is less than three times the distance between the two most distant liquid orifices, and in another embodiment, the distance between any liquid orifice and the collision point is less than the distance between the two most distant liquid or gas orifices, whichever is smaller.

In an embodiment of the present invention, the liquid jets and gas jets are produced by separate nozzles.

In an embodiment of the present invention, the liquid is selected from water, an aqueous solution, suspension and emulsion. In an embodiment, the liquid is a fuel selected from gasoline, diesel, alcohol, JP8, kerosene, and any mixture thereof, and the injector is used in an engine selected from a reciprocating internal combustion engine, a rotary internal combustion engine, a gas turbine engine and a jet engine.

In an embodiment of the present invention, the injector has 2 to 30 liquid or gas jets colliding at one or more collision focal points.

In one embodiment, the liquid and gas injectors inject respective liquids and gas into an internal combustion engine. In an embodiment, the liquid and gas injectors inject respective liquids and gas into a combustion chamber of a reciprocating or rotary internal combustion engine.

In an embodiment, the liquid and gas injectors for internal combustion engines are designed to deliver, on command, a specific quantity of a gas or liquid, respectively and simultaneously keeping a dead volume to acceptable minimum. This requires careful control over the flow rate over time, which is traditionally achieved via a solenoid; however, this can also be controlled via hydraulic pilot actuation, hydraulic amplification, piezo-electric stack, pneumatic means, or other methods.

In an embodiment, the gas jet and liquid jet metering means provides a precise quantity of gas flow and liquid flow, respectively, at a precise start and stop time and may be located inside or outside the injector body. In one embodiment, gas jet and liquid jet metering means may include a solenoid controlled pintle or a piezo-electric controlled pintle.

In one embodiment, the pintle may be a reciprocating shaft in a sleeve in the injector with the end of the pintle valve at the nozzle being a rounded bulbous portion, i.e., a pintle ball. The nozzle includes the body 1 with central axis a-a and an inlet passage, e.g., either passage 4 (in the case of liquid) or inlet passage 5 (in the case of gas), may comprise a terminal end of a pintle shaft and pintle ball. For the case of liquid injection, liquid exit passageways, which transmit pressurized liquids in the nozzle to exit orifices, originate at a point in a pintle ball valve seat area. In the default position, the pintle ball is pressed against a valve seat. When the pintle ball is pressed against the valve seat, no liquid can flow into the outgoing passages, and no liquid flows out of the injector body. When the pintle ball is shifted to the open position, e.g., by an electronic control solenoid or piezo-electric mechanism, the pressurized liquid flows through a space defined by the valve and into the outgoing passages and out of the nozzle body at jet exit orifices.

Pressurized liquid and a gas may be supplied from a respective liquid and gas source to a respective flow control system and metered liquid and gas is respectively fed to respective feed passages within the injector body. The resulting jets collide at the one or more focal points. The flow control system provides a respective metering means, which provides a controlled continuous rate of flow of the respective liquid and gas. In one embodiment, gas supply and pressure is regulated at the injector with a start/stop metering mechanism for gas-assist as conventionally known. For example, in one embodiment, a pintle valve is used as in liquid injectors. Any conventional means such as pintle valve at or before the cavities 2 and 3 in FIG. 1 may be employed and include part of inlet passages 4 and 5.

For example, the pintle valve seat and pintle ball define a 'sac' volume, which must be as small as possible, subject to proper entry conditions for outgoing passages. Each of the outgoing passages is in liquid communication with the 'sac' volume at a first end, and terminates at a respective orifice exit at a second end. Outgoing passages forms single inclined jets at a defined collision angle as described herein. The plurality of jets emanating from orifices at the end of passages are directed to collide at a single focal point (i.e. collision point).

The pressure applied to the liquids and gas of the inventive injector varies depending on the location of the injector in the engine and the type of liquid/gas.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A liquid injector for producing an atomized liquid, the liquid injector comprising:
    an injector body having a central axis, the injector body comprising:
        a liquid inlet,
        a liquid metering means either within the body or outside the body, and
        a liquid outlet comprising a nozzle, the nozzle comprises a central axis, an interior end, and an exterior end, two or more passages originating from the interior end and terminating at the exterior end with a respective liquid orifice; and
    a gas regulating means configured to regulate the flow or pressure of a gas through gas orifices internal or external to the injector body;
    wherein a pressurized liquid is forced through the two or more passages to the orifice terminating each passage, and at least one gas jet being forced through the gas orifices, where each liquid orifice and each gas orifice directs a jet of the pressurized liquid and gas,
    wherein the orifices are configured such that at least two liquid jets and two gas jets are aimed at two or more common focal points in coaxial alignment with the central axis external to the injector, wherein a collision of pressurized liquid jets and gas jets at each focal point creates an atomized form of the liquid.

2. The liquid injector for producing an atomized liquid as claimed in claim 1, the liquid injector comprising:
    an injector body comprising:
        a liquid inlet,
        a liquid metering means either within the body or outside the body, and
        a liquid outlet comprising a nozzle, the nozzle comprises a central axis, an interior end, and an exterior end, two or more passages originating from the interior end and terminating at the exterior end with a respective liquid orifice; and
    a gas regulating means configured to regulate the flow or pressure of a gas through gas orifices internal or external to the injector body;
    wherein a pressurized liquid is forced through the two or more passages to the respective liquid orifice terminating each passage, where each liquid orifice and each gas orifice directs a jet of the pressurized liquid and gas, respectively,
    wherein the liquid orifices and gas orifices are configured such that at least two liquid jets and two gas jets are aimed at one or two focal points external to the injector body, and
    wherein a collision of liquid jets and gas jets at each focal points creates an atomized form of the liquid.

3. The injector as in claim 1, wherein an angle formed between each liquid jet and a central axis of the liquid injector is between 5° and 85°, inclusive, and the angle formed between each gas jet and a central axis of the injector is between 0° and 75°, excluding 0° and including 75°.

4. The injector as in claim 1, wherein the distance between any liquid orifice and the collision at a focal point is less than three times the difference between two most distant liquid orifices.

5. The injector as in claim 1, wherein the distance between any liquid orifice and the collision at a focal point is less than the distance between two most distant liquid orifices.

6. The injector as in claim 1, wherein the orifice diameter is greater than 50 μm.

7. The injector as in any one of claim 1, wherein the liquid jets or gas jets are produced by separate nozzles.

8. The injector as in any one of claim 1, wherein the gas is air.

9. The injector as in any one of claim 1, wherein the liquid is a fuel selected from gasoline, diesel, alcohol, JP8, kerosene, and any mixture thereof.

10. The injector as in any one of claim 1, wherein the injector is used in an engine selected from a reciprocating internal combustion engine, a rotary internal combustion engine, a gas turbine engine and a jet engine.

11. The injector as in any one of claim 1, wherein the injector has 2 to 30 liquid or gas jets, inclusive colliding.

12. The liquid injector according to claim 1, wherein each liquid orifice and each gas orifice have an equal diameter.

13. A liquid injector for producing atomized liquid, the injector comprising:
    an injector body having a central axis, the injector body comprising:
        a liquid inlet,
        a liquid metering means either within the body or outside the body, and
        a liquid outlet comprising a nozzle, the nozzle comprises a central axis, an interior end, and an exterior end, two or more passages originating from the interior end and terminating at the exterior end with a respective liquid orifice; and
    a gas regulating means configured to regulate the flow or pressure of a gas through gas orifices external to the injector body;
    wherein a pressurized liquid is forced through the two or more passages to the orifice terminating each passage, and at least one gas jet being forced through the gas orifices, where each liquid orifice and each gas orifice directs a jet of the pressurized liquid and gas,
    at least two liquid jets colliding at a first focal point; and
    at least two gas jets colliding at second focal point, the first and second focal points juxtapositioned to one another in coaxial alignment with the central axis, wherein a distance between the juxtapositioned two focal points ranges from less than the mean diameter of the liquid orifice up to about 10 times the mean diameter of the liquid orifice.

14. The liquid injector according to claim 13, wherein an angle formed between each liquid jet and a central axis of the liquid injector is between 5° and 85°, inclusive, and the angle formed between each gas jet and a central axis of the injector is between 0° and 75°, excluding 0° and including 75°.

15. The liquid injector according to claim 13, wherein the liquid jets or gas jets are produced by separate nozzles.

16. The liquid injector according to claim 13, wherein the gas is air.

17. The liquid injector according to claim 13, wherein the orifice diameter is greater than 50 μm.

18. The liquid injector according to claim 13, wherein the injector is used in an engine selected from a reciprocating internal combustion engine, a rotary internal combustion engine, a gas turbine engine and a jet engine.

19. The liquid injector according to claim 13, wherein the injector has 2 to 30 liquid or gas jets, inclusive colliding.

20. The liquid injector according to claim 13, wherein each liquid orifice and each gas orifice have an equal diameter.

21. A liquid injector for producing atomized liquid, the liquid injector comprising:
    a first fluid inlet;
    a second fluid inlet;
    a first annular cavity in fluid communication with the first fluid inlet;
    a second annular cavity in fluid communication with the second fluid inlet, the second annular cavity being disposed coaxially and concentric to the first annular cavity;
    a nozzle having a plurality of exit orifices formed on an exterior surface, each exit orifice defining an end of a respective through passage formed in an interior portion of the nozzle, a first subset of each respective through passage providing fluid communication between the respective exit orifice and the first annular cavity and a second subset of each respective through passage providing fluid communication between the respective exit orifice and the second annular cavity,
    wherein the plurality of exit orifices are configured to direct fluid jets to one or more collision focal points.

22. The injector as in claim 21, wherein the first fluid inlet receives a liquid and the second fluid inlet receives a gas.

23. The injector as in claim 21, wherein an angle formed between each fluid jet and a central axis of the liquid injector is between 5° and 85° inclusive, for fluid jets originating from the exit orifices in fluid communication with the first annular cavity, and the angle formed between each gas jet and a central axis of the injector is between 0° and 75° excluding 0 and including 75° for fluid jets originating from the exit orifices in fluid communication with the second annular cavity.

24. The injector as in claim 21, wherein the distance between any exit orifice in fluid communication with the first annular cavity and the collision point is less than 3 times the diameter of the injector body.

25. The injector as in claim 21, wherein the distance between any exit orifice in fluid communication with the first annular cavity and the collision point is less than the distance between the two most distant liquid orifices.

26. The injector as in claim 21, wherein the exit orifice diameter is greater than 50 μm.

27. The injector as in claim 21, wherein the gas is air.

28. The injector as in claim 21, wherein the liquid is a fuel selected from gasoline, diesel, alcohol, JP8, kerosene, and any mixture thereof.

29. The injector as in claim 21, wherein the injector is used in an engine selected from a reciprocating internal combustion engine, a rotary internal combustion engine, and a jet engine.

30. The injector as in claim 21, wherein the injector has 2 exit orifices to 30 exit orifices, inclusive in fluid communication with the first annular cavity and 2 exit orifices to 30 exit orifices, inclusive in fluid communication with the second annular cavity.

31. The liquid injector according to claim 21, wherein said plurality of exit orifices each have an equal diameter.

* * * * *